United States Patent
Schuster et al.

(10) Patent No.: US 7,763,178 B2
(45) Date of Patent: Jul. 27, 2010

(54) BIODEGRADABLE SURFACE LAYER FILM FOR POOLS OR SPAS TO PREVENT EVAPORATION AND HEAT LOSS

(75) Inventors: Alan Schuster, Apex, NC (US); Larry Ruizzo, Lakewood, NJ (US); Richard Holstein, Lakewood, NJ (US); Shawn Mikuski, Lakewood, NJ (US)

(73) Assignee: Smartpool, Inc., Lakewood, NJ (US)

( * ) Notice: Subject to any disclaimer, the term of this patent is extended or adjusted under 35 U.S.C. 154(b) by 722 days.

(21) Appl. No.: 11/701,032

(22) Filed: Feb. 2, 2007

(65) Prior Publication Data

US 2008/0187471 A1   Aug. 7, 2008

(51) Int. Cl.
*C02F 1/00* (2006.01)
*E04H 4/14* (2006.01)
(52) U.S. Cl. .................. 210/749; 210/167.11; 252/384
(58) Field of Classification Search ................ 210/749, 210/765, 167.1, 167.11; 252/383, 384
See application file for complete search history.

(56) References Cited

U.S. PATENT DOCUMENTS

| | | | | |
|---|---|---|---|---|
| 3,391,987 A | * | 7/1968 | Myers | 422/43 |
| 3,415,614 A | * | 12/1968 | Egan et al. | 422/43 |
| 4,250,140 A | * | 2/1981 | Rowlette | 422/43 |
| 4,519,914 A | * | 5/1985 | Etani | 210/633 |
| 5,552,087 A | * | 9/1996 | Zeheb et al. | 252/408.1 |
| 6,207,048 B1 | * | 3/2001 | Bonelli | 210/198.1 |
| 6,303,133 B1 | * | 10/2001 | O'Brien | 424/409 |
| 2008/0107696 A1 | * | 5/2008 | Czech et al. | 424/401 |

* cited by examiner

*Primary Examiner*—Fred Prince
(74) *Attorney, Agent, or Firm*—Clifford G. Frayne

(57) ABSTRACT

The present invention relates to swimming pools and other pools of standing water, and in particular to a dispensing unit that distributes a chemical solution that reduces evaporation and heat loss by forming a film or monomolecular layer over the surface or substantial surface area of the swimming pool or water pond.

3 Claims, 2 Drawing Sheets

BIODEGRADABLE SURFACE LAYER FILM FOR POOLS OR SPAS TO PREVENT EVAPORATION AND HEAT LOSS

BACKGROUND OF THE INVENTION

1. Field of the Invention

The present invention relates to swimming pools and other pools of standing water, and in particular to a dispensing unit that distributes a chemical solution that reduces evaporation and heat loss by forming a film over the surface area of the swimming pool or water pond.

2. Description of the Prior Art

This invention relates to water quality, and more particularly to methods and apparatus for feeding controlled amounts of chemicals into swimming pools, hot tubs, spas, cooling towers and other standing water ponds, the particular chemical solution forming a film or monomolecular layer over the surface area of the pool, thus reducing evaporation, heat loss, and the loss of any other chemicals which may be utilized in chemically treating the water content of the pool.

In home swimming pools and in newly popular hot tubs, spas, and other water pools, it is almost always necessary to filter and recirculate the water and to add certain chemicals, such as organic flocculating agents, which greatly improved the effectiveness of the filters in removing impurities.

Still further, chlorination is undertaken in swimming pools, hot tubs and spas in order to improve the quality of water and in some instances, chelating agents are positioned in the water to prevent the formation of scale in boilers.

In large public and commercial systems, apparatus know as "feeders" are used to meter predetermined amounts of such chemicals into the water. This is practical from the stand point of large industrial and public treatment facilities, but the necessary capital investment for such equipment makes it impractical for a home pool, spa, hot tub or small cooling tower.

Additionally, with respect to swimming pools, hot tubs and spas, there are often extended periods of time when the swimming pool, hot tub or spa is not in use, yet the swimming pool, hot tub or spa is subjected to the ambient weather conditions, which depending upon the time of year, can include extreme heat. In such a situation, the swimming pool, hot tub or spa looses water volume to evaporation, which in turn effects the chemistry of the water in the swimming pool, hot tub or spa, due to the reduced volume. Mechanical pool covers and the like can be utilized, but their installation is time consuming and cumbersome, and delays the reuse of the swimming pool, hot tub or spa when desired by the user in that the mechanical cover must be removed and stored.

It has been discovered that many of the desired water treatment chemicals needed for relatively small swimming pools, hot tubs and spas, can be packaged and shipped in closed and sealed plastic spheres of handy size. In use, one or more holes are opened in the shell of the sphere and the chemical enclosed is dropped in the water system. It has further been discovered that the motion of the water and of the sphere in the water can produce the desired rate of chemical feeding. A dispensor of this type and suitable for dispensing Applicant's formulation is disclosed by Etani in U.S. Pat. No. 4,519,914, which is incorporated by reference.

In one embodiment, the capsule is used to add alum to the water of a backyard swimming pool. Dropped into the skimmer basket it introduces alum at a substantially constant rate proportional to the rate of flow and independent of the amount of undissolved alum remaining in the capsule. Although at any instant the dispensing rate from the capsule will depend upon the position of the tiny holes relative to the flow, the positioned effect is eliminated, on the average, because of the movement of the capsule. This type of chemical feeding provides a cleaner pool and a more economical method of introducing the chemicals into the pool.

The present invention adapts the use of these sealed plastic spheres to a chemical solution that reduces the evaporation and heat loss of a swimming pool by forming a film or monomolecular layer over the surface of the area of the swimming pool, hot tub or spa, and thereby reduces evaporation, heat loss, and maintains the chemistry of the water of the swimming pool, hot tub or spa.

OBJECTS OF THE INVENTION

An object of the present invention is to provide for a novel delivery system for water treatment chemicals for swimming pools, hot tubs and spas.

Another object of the present invention is to provide for a novel delivery system in the form of a safe container for storage, shipment and introduction of water chemicals that both simple and safe.

Still another object of the present invention is to provide for a novel delivery system for a chemical solution for a swimming pool, hot tub or spa which reduces evaporation and heat loss and maintains the chemistry of the swimming pool by forming a film or monomolecular layer over the surface or substantial surface area of the swimming pool, hot tub or spa.

SUMMARY OF THE INVENTION

The present invention relates to swimming pools and other pools of standing water, and in particular to a dispensing unit that distributes a chemical solution that reduces evaporation and heat loss by forming a film or monomolecular layer over the surface or substantial surface area of the swimming pool or water pond.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
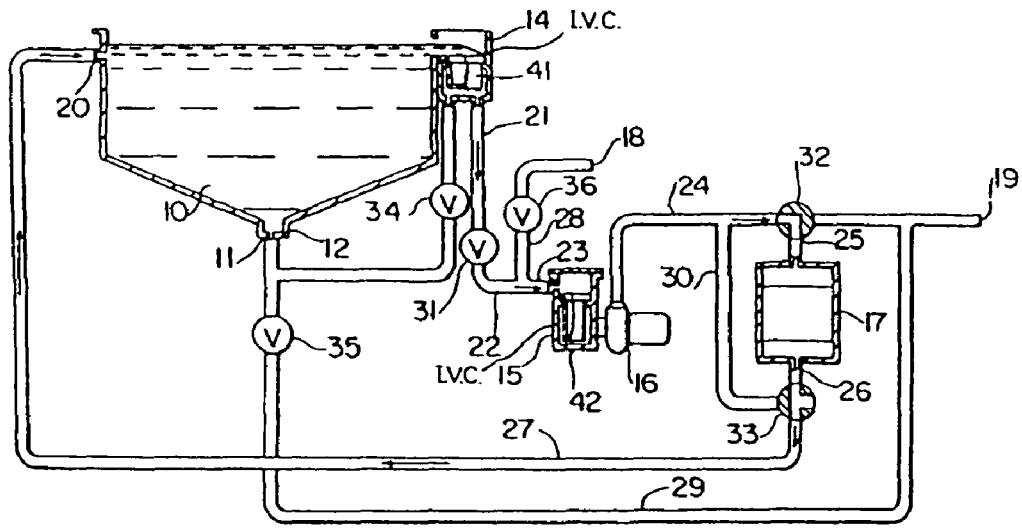
FIG. 1 is a schematic diagram of a typical home swimming pool.

As indicated in FIG. 1, a typical swimming pool comprises a pool 10, which has a drain 11 and sump 12 at the bottom of the pool, and a skimmer 14, which carries away overflow and collects floating debris, a strainer 15 at the inlet to a pump 16, a filter 17, a water main 18, a source of fresh water, a system outlet 19 and a pool inlet 20. Pipes 21-30 and valves 31-36 connect all of the aforesaid elements.

In normal operation water is taken from the pool through the skimmer 14, the pipe 21, the valve 31, pipes 22 and 23, strainer 15, pump 16, pipe 24, valve 32, pipe 25, filter 17, pipe 26, valve 33 and pipe 27, back to the pool inlet 20. Valve 34 allows water to be recirculated in whole or in part from the bottom drain 11 and valve 35 allows water to be gravity dumped through pipe 29 to the system outlet 19. Valve 36 connects the main 18 to replenish through pipes 28 and 23. The valves 32 and 33 may be turned to backwash the filter 17 via pipe 30. The skimmer 14 is arranged to collect leaves and other floating debris. To prevent the plugging of pipes 21, 22, 23, and pump 16, the skimmer 14 has perforated basket 41 of larger diameter and strainer 15 has a strainer basket 42. While the flow velocity of the baskets is much less than in the pipes, it is still perceptible and non-uniform so that when a container of chemical of the kind described hereafter is dropped into the perforated basket in the skimmer, or in the strainer basket, it bobs or flutters with the flow through the baskets. The feeder may be inserted at these places or a special chamber.

Figure 2:
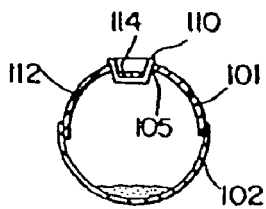
FIG. 2 is a cross section of the dispensing container.

FIG. 2 is representative of a practical embodiment for a dispensing container for chemicals, hereinafter termed a "feeder". The feeder comprises two plastic hemispheres 101, 102 which are joined together in the manner of some table tennis balls with cement. The hemisphere 101 has a filling hole 105, which is closed by a plug 110. For dispensing the chemical, there are a number of small holes 112 in the hemisphere 101. Plug 110 has a porous buoyant portion 114.

Figure 3:
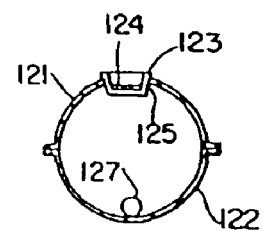
FIG. 3 is an alternative construction of the dispensing container.

FIG. 3 represents a construction in which two hemispheres 121 and 122 are joined at a flange. The thermo-plastic hemispheres with flanges can be made easily by the vacuum-forming process. This is the preferred construction when polyvinyl chloride (PVC) is used, or when the filling chemical is compressed into a solid ball "brickette". The flange closure is readily achieved by ultrasonic welding, and the flange assists the rotation of the feeder in the eddies of flow. It also facilitates the handling and packaging of the feeders. The body of chemical, or an added weight 127 tends to stabilize the upward orientation of the feeder holes in conditions of low flow.

Figure 4:
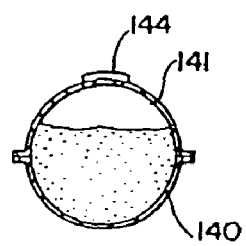
FIG. 4 is a second alternative construction of the dispensing container.

FIG. 4 represents an alternate closure of the feeder of FIG. 3. In this construction the feeder is filled by the supplier with a desired quantity of chemical 140, leaving an empty space 141, and sealed with a patch 144. The empty space may be filled with inert gas for chemicals which may be degraded in the presence of air or moisture. With this construction, the user must make the proper number of dispensing holes by piercing the feeder with a needle or the like.

Figure 5:
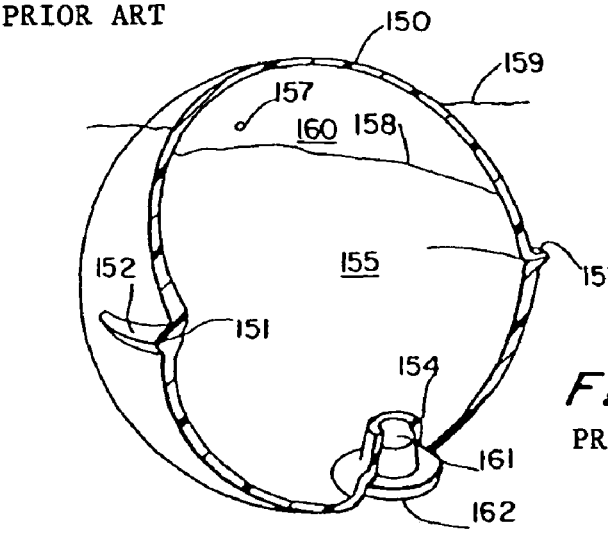
FIG. 5 is a cutaway view of the dispensing container.

FIG. 5 is a cut-away drawing of the capsule configuration preferred for most swimming pool and spa uses. The sphere is blow molded of high density polyethylene. Twenty-two grams of the polymer are needed for a sphere 23/4 inches in diameter. The shell 150 varies somewhat in thickness between about one sixteenth and one eighth of an inch. The mold is made in two parts. When molding is complete the sphere is left with a small hole at 151 and a pair of stub wings 152 and 153 which serve the function of the flange in the configuration of FIG. 3. In preparation for filling, the blow hole 151 is closed, and the filling hole 154, formed in the mold, is clearly cut through, both operations using an ultrasonic tool. It is desired that this capsule float with each dispensing hole 157 near the liquid levels inside 158, and outside 159, the capsule when it is resting in still water. To achieve this result, an air space 160 is left after filling with the emulsion, and zero-gauge buck shot 161 is swaged into the filler plug 162.

Figure 6:
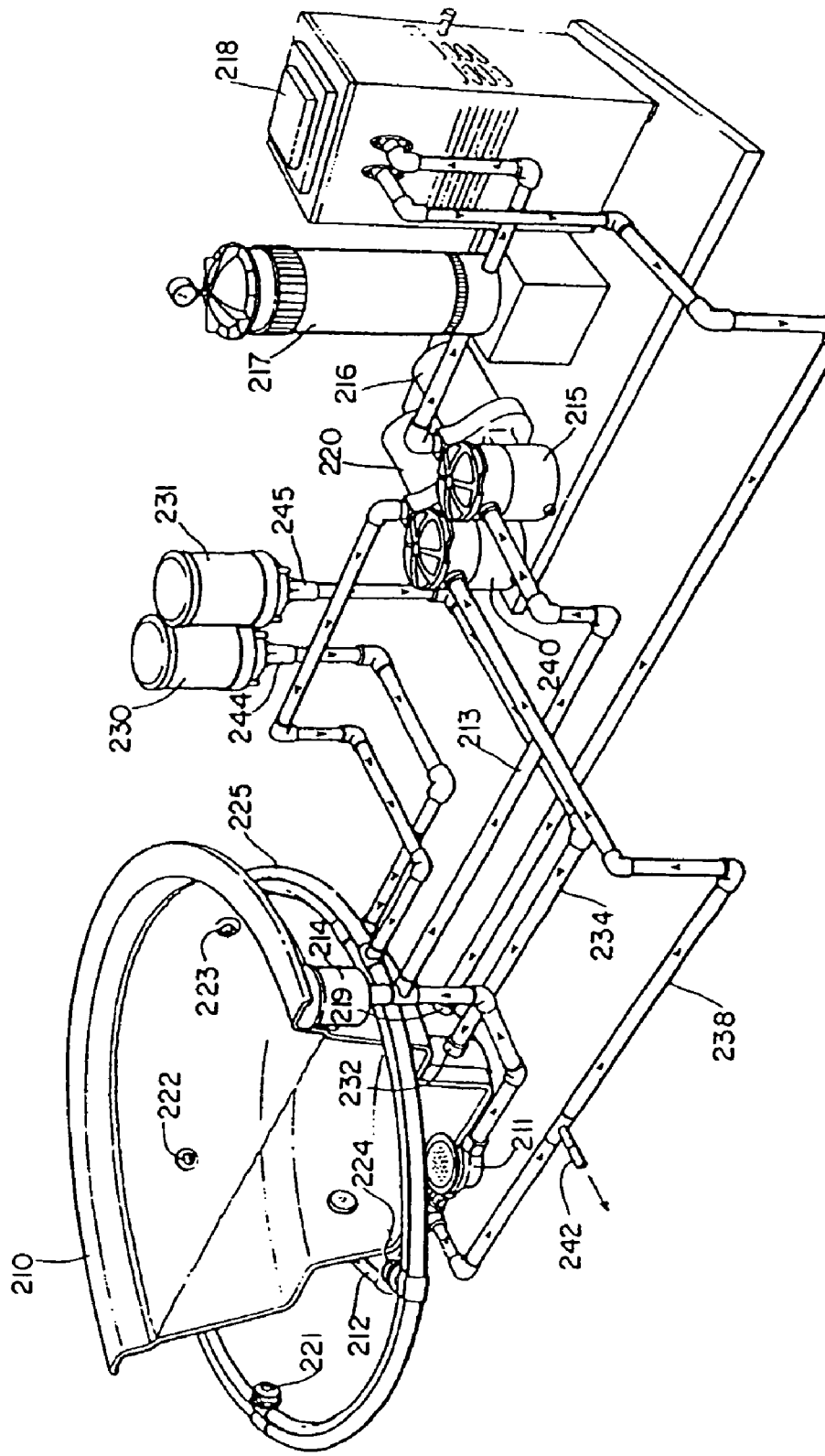
FIG. 6 is a schematic diagram of a spa.

FIG. 6 is a drawing representative of a so-called "spa" or "hot tub" showing the features which characterize such systems. The spa provides a setting for communal bathing in warm water with the active stimulation of vigorous jets of water and air. The hot tub is a close relative of the spa, characterized by a classical construction in the form of a large round wooden vat with a simple wooden bench. The spa, built up of concrete, tile or fiberglass has more comfortable seating, and more flexible shape, seating arrangement, and plumbing. The system of FIG. 6 has a tub 210 which has a main drain 211 at the bottom. Water is returned through pipe 213 from the drain 211 and a skimmer 214 to a strainer 215, and a water pump 216. From the pump 216 the water goes through a filter 217, a water heater 213, and returns to the tub at inlet 219. A second pump 220 called a "booster pump" propels water forcefully from jets 221-224. An air pump 230 feeds air to the water jets 221-224 in a ventury connection whereby a large quantity of air is entrained in the jets of water. A second air pump 231 is connected to an air jet 232 that blows air directly into the water in the tub by way of the pipe 234. Water is returned from the tub by way of return line 238 and strainer 240 to the booster pump 220. Supply water may be added, and the system drained by the pipe 242.

In order to create a film or monomolecular layer over the surface area of the swimming pool or spa, the delivery capsule would be filled with a solution which upon release due to the action of the water in the pool or spa previously described, would create an invisible, ultra-thin layer or film of a possibly monomolecular, non-toxic, biodegradable film, which would prevent evaporation and heat loss, and maintain the level of chemicals in the pool or spa.

The solution contained in the delivery capsule in order to create the film or monomolecular layer over the surface or substantial surface area of the swimming pool, spa, or other water pool, would include as a minimum, an evaporative inhibitor in a carrier or medium such as water or deionized, filtered water. The evaporative inhibitor would be present in a range of from 1 percent to 8 percent and the carrier or medium such as water or deionized, filtered water would be present in a range of from 92 percent to 99 percent. A suitable evaporative inhibitor for use in the solution would be cetyl alcohol.

Additional constituents for the solution could also include non-ionic emulsifiers which would improve the performance of the solution. Suitable non-ionic emulsifiers include poly-oxy-ethylene (20) sorbitan monolaurate in a range of from 0.10 percent to 4.0 percent and which is sold under the brand name Tween 20. Another non-ionic emulsifier, also suitable for use and inclusion, would sorbitan monopalmitate in a range of from 0.10 percent to 4.0 percent, and which is sold under the brand name Span 40. A still further suitable non-ionic emulsifier would be poly-oxy-ethylene (20 cetyl ether) in a range of from 0.10 percent to 4.0 percent and sold under the brand name Brij 58.

In addition to the foregoing, certain stabilizers may be desired with respect to the solution and the constituents thereof. Suitable preservatives include propylene glycol at a maximum weight percentage of 2.0 percent, methyl paraben at a maximum weight percent of 0.15 percent, and propyl paraben at a maximum weight percent of 0.05 percent. The preservatives should, if utilized, be utilized as close to their maximum values as possible in order to not adversely affect the viscosity of the solution.

Additionally, an anti-foam may be utilized to aid in the formulation process for a more effective filling of the delivery capsule. An silicone anti-foam in a weight percentage range of 0.10 percent to 4.0 percent has been found to be effective.

An invisible, ultra-thin, preferably monomolecular layer or film may be formed over the surface of a swimming pool, spa, or other water pool to provide for an invisible layer of non-toxic, biodegradable film which would prevent evaporation and heat loss and maintain the level of chemicals in the pool or spa through the use of a solution contained in the delivery capsule, which delivery solution includes water, deionized, filtered water, and cetyl alcohol in the ranges first mentioned above. The additional constituents mentioned above may be added to the cetyl alcohol water solution to improve its performance.

The preferred formulation for the solution disbursed from the delivery capsule would be as follows by weight percent.

| | |
|---|---|
| Deionized water | 93.1% |
| Propylene Glycol | 2.0% |
| Methyl paraben | 0.15% |
| Tween 20 (polysorbate 20) | 0.2% |
| Cetyl alcohol | 4.0% |
| Span 40 | 0.20% |
| Brij 58 | 0.20% |
| Antifoamant>>>>>> | 0.10% |
| Propyl paraben | 0.05% |

In this preferred formulation embodiment, depending upon the size of the pool, the delivery capsule will disburse the formulation to form the invisible layer of non-toxic, biodegradable film, which will prevent evaporation and heat loss. While the preferred embodiment has been stated above, it has been found that the constituents of the formulation may fall within the following ranges and still provide for an invisible layer of non-toxic, biodegradable film, which achieves the results desired.

| | |
|---|---|
| Deionized water | 92.0%-99% |
| Propylene Glycol | Up to 2.0% |
| Methyl paraben | Up to 0.15% |
| Tween 20 (polysorbate 20) | 0.10%-4.0% |
| Cetyl alcohol | 1.0%-8.0% |
| Span 40 | 0.10%-4.0% |
| Brij 58 | 0.10%-4.0% |
| Antifoamant | 0.10%-4.0% |
| Propyl paraben | 0.05% maximum |

Testing and experience has determined that depending upon the size of the dispenser and its contents, it will take approximately up to 7-10 days under normal conditions to totally dispense the contents and form the evaporative inhibiting film. A non-toxic dye may be utilized as an indicator of total dispersion.

The dispensed solution and resultant evaporating inhibitive film would have an effective life of up to two months, depending upon agitation. If the pool or spa is agitated through ordinary use, the film will be disrupted but will reform upon cessation of use and agitation for the time prescribed. The more agitation or disruption per period of time will result in less efficacy.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

What is claimed is:

1. A method of forming a film or monomolecular, non-toxic, biodegradable surface layer film for swimming pools, spas, hot tubs or water ponds in order to prevent evaporation, limit heat loss, and maintain chemical balance comprising:

forming a dispensing container having a volume of between 0.1 and less than 24 cubic inches, said dispensing container being resistant to attack by water and chemical, said dispensing container perforated by a plurality of small holes, each of less than three square mm in cross section and greater than 5,000ths of an inch in diameter, and with an aggregate area of said holes less than 0.2% of the surface area of said dispensing container, said dispensing container being spherical in shape and having neutral buoyancy dependant upon water velocity flow so as to cause said dispensing container to move about freely and roll on the surface of the water, said dispensing container having a chamber of sufficient size to contain a solution for forming said monomolecular, biodegradable surface layer film;

forming a solution of deionized water, propylene glycol, methyl paraben, poly-oxy-ethylene sorbitan monolaurate, cetyl alcohol, sorbitan monopalmitate, cetyl ether, antifoaming agent, and propyl paraben, and introducing said solution into said dispensing container and sealing same;

puncturing said plurality of small holes in said dispensing container;

positioning said dispensing container in said swimming pool, hot tub, spa, or water pond so as to move freely under the influence of said water velocity and to dispense said solution, forming said film or monomolecular, biodegradable surface layer film on said surface of said swimming pool, hot tub, spa or water pond so as to prevent evaporation, heat loss and to maintain chemical balance.

2. The method of forming a film or monomolecular, non-toxic, biodegradable surface layer film for swimming pools, spas, hot tubs or water ponds in accordance with claim 1 comprising a solution of water, deionized water, or filtered water in the weight percent range of from 92.0% to 99.0%; propylene glycol is present in a maximum of 2.0%;

methyl paraben is present in a maximum of 0.15%; poly-oxy-ethylene (20) sorbitan monolaurate is present in a range of from 0.10% to 4.0%; cetyl alcohol is present in a range of from 1. 0% to 8.0%; sorbitan monopalmitate is present in a range of from 0.10% to 4.0%; poly-oxy-ethylene (20 cetyl ether) is present in a range of from 0.10% to 4.0%; antifoaming agent is present in a range of from 0.10% to 4.0%; and propyl paraben is present in a maximum of from 0.05%.

3. The method of forming a film or monomolecular, non-toxic, biodegradable surface layer film for swimming pools, spas, hot tubs or water ponds in accordance with claim 2 comprising a solution of constituents in the following weight percentages:

deionized water 93.1%; propylene glycol 2.0%; methyl paraben 0.15%, poly-oxy-ethylene (20) sorbitan monolaurate 0.2%; cetyl alcohol 4.0%; sorbitan monopalmitate 0.20%; poly-oxy-ethylene (20 cetyl ether) 58 0.20%; an antifoaming agent 0.10%; and propyl paraben 0.05%.

* * * * *